United States Patent [19]

Matayabas, Jr. et al.

[11] Patent Number: 5,608,117
[45] Date of Patent: *Mar. 4, 1997

[54] PROCESS FOR PRODUCING SATURATED POLYETHER GLYCOLS AND ALCOHOLS DERIVED FROM 3, 4-EPOXY-1-BUTENE

[75] Inventors: James C. Matayabas, Jr.; Stephen N. Falling, both of Kingsport, Tenn.

[73] Assignee: Eastman Chemical Company, Kingsport, Tenn.

[*] Notice: The term of this patent shall not extend beyond the expiration date of Pat. No. 5,398,867.

[21] Appl. No.: 520,356

[22] Filed: Aug. 28, 1995

Related U.S. Application Data

[60] Division of Ser. No. 327,951, Oct. 24, 1994, Pat. No. 5,466,759, which is a continuation-in-part of Ser. No. 181,734, Jan. 18, 1994, abandoned.

[51] Int. Cl.$^6$ ............................ C08G 65/14; C08G 65/20
[52] U.S. Cl. .................... 568/616; 568/617; 568/618; 568/619; 568/623; 568/625
[58] Field of Search .................... 568/618, 619, 568/616, 617, 623, 625

[56] References Cited

U.S. PATENT DOCUMENTS

| | | | |
|---|---|---|---|
| 4,480,124 | 10/1984 | Mueller | 568/617 |
| 5,393,867 | 2/1995 | Matayabas et al. | 568/619 |
| 5,434,314 | 7/1995 | Matayabas et al. | 568/616 |

OTHER PUBLICATIONS

Hillmyr et al., Macromolecules, 25, 3345–3350 (1992).
Blanchard, *J. Polym. Sci.*, Part A–1, 9(12), 3547–54, (1971).
Hammond, *J. Polym. Sci.*, Part A–1, 9(2), 265–79 (1971).
Baijal, *J. Polym. Sci.*, Part C, No. 23, 157 (68).

*Primary Examiner*—D. R. Wilson
*Attorney, Agent, or Firm*—J. Frederick Thomsen; Harry J. Gwinnell

[57] ABSTRACT

Disclosed are novel saturated polyether compounds comprised of n units of residue (1) and m units of residue (2), wherein (i) residues (1) and (2) have the structures:

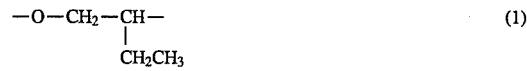

and

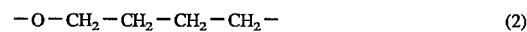

(ii) the total value of n+m is 2 to 70 and m/(n+m) is 0.05 to 0.98; (ii) at least 98 percent of the terminal hydroxyl groups of the polyether have the structure:

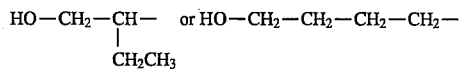

The polyethers are obtained by first polymerizing 3,4-epoxy-1-butene to produce unsaturated polyether precursors comprising residues (1A) and (2A) having the structures:

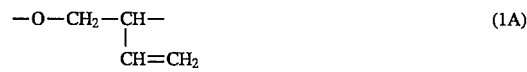

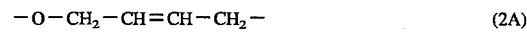

and then hydrogenating the unsaturated polyether precursors. The hydrogenation advantageously is performed in the presence of a nickel hydrogenation catalyst.

3 Claims, No Drawings

PROCESS FOR PRODUCING SATURATED POLYETHER GLYCOLS AND ALCOHOLS DERIVED FROM 3, 4-EPOXY-1-BUTENE

This is a divisional application of Ser. No. 08/327,951, filed Oct. 24, 1994, now U.S. Pat. No. 5,466,759, which is a continuation-in-part of Ser. No. 08/181,734, filed Jan. 18, 1994 (now abandoned).

This invention pertains to certain novel saturated polyether glycols and alcohols. More specifically, this invention pertains to saturated polyether glycols and alcohols comprising repeating units of the structure:

(1)

and

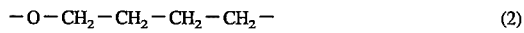
(2)

This invention also pertains to a process for the preparation of the novel polyether compounds by catalytic hydrogenation of unsaturated polyether glycols and alcohols prepared from 3,4-epoxy-1-butene and comprising repeating units of the structure:

(1A)

and

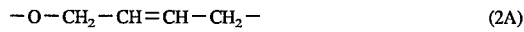
(2A)

A series of papers [L. P. Blanchard, et al., J. Polym. Sci., Part A-1, 9(12), 3547–54 (1971); L. P. Blanchard, et al., Kinet. Mech. Polyreactions, Int. Symp. Macromol. Chem., Prepr., Volume 1, 395–9. Akad. Kiado: Budapest, Hung. (1969); and J. M. Hammond, J. Polym. Sci., Part A-1, 9(2), 265–79 (1971)] teach that a mixture of cyclic oligomers and polyether glycols containing residues (1) and (2) can be prepared by the copolymerization of 1,2-butylene oxide and tetrahydrofuran in the presence of boron trifluoride etherate and a glycol initiator. However, only minor amounts of residue (2), in the range of about 20 to 55 percent, may be incorporated by this method, and, according to the description of Blanchard, et al., the resulting polyether glycol cannot be terminated with residue (2). Our investigation of this chemistry showed that a copolymer of 1,2-butylene oxide and tetrahydrofuran, prepared as described by Blanchard, et al., is terminated with residue (1) only. Furthermore, as is shown in Comparative Example 1 hereof, about 75% of the terminal hydroxyl groups of the copolymer are secondary and 25% of the terminal hydroxyl groups are primary hydroxyl groups.

The presence of secondary hydroxyl groups in the polymers referred to in the preceding paragraph is not unexpected in view of a number of publications [P. Kubisa, Makromol. Chem., Macromol. Symp., 13/14, 203 (1988); K. Brzezinska, R. Szymanski, P. Kubisa, and S. Penczek, Makromol. Chem., Rapid Commun., 7, 1 (1986); M. Bednarek, P. Kubisa, and S. Penczek, Makromol. Chem., Suppl., 15 49 (1989); P. Kubisa and S. Penczek, Am. Chem. Soc., Div. Polym. Chem., Polym. Preprints, 31(1), 89–90 (1990); and T. Biedron, R. Szymanski, P. Kubisa, and S. Penzcek, Makromol. Chem., Macromol. Symp., 32, 155 (1990)] which teach that the polymer microstructure from copolymerization of propylene oxide and tetrahydro-furan using boron trifluoride etherate and a glycol initiator is determined by interplay of steric and electronic factors, with steric factors prevailing to give copolyethers with about 55 percent secondary hydroxyl groups and 45 percent primary hydroxyl groups. Further, they teach that the major contribution of the electronic effects of the side group is its influence on the basicity of the secondary hydroxyl of the growing chain. Butylene oxide gives a greater amount of secondary hydroxyl than does propylene oxide due to greater steric effects of the ethyl group compared to the methyl group.

E. J. Vandenberg, U.S. Pat. No. 3,509,118, discloses unsaturated polyether glycols containing residue (1A) and prepared by n-butyl lithium cleavage of the alkyl-capped, high molecular weight polyether prepared by the polymerization of 3,4-epoxy-1-butene in benzene using triethylaluminum prereacted with water. However, hydrogenation of the polyether glycols is neither disclosed nor contemplated.

M. A. Hillmyer, et al; Macromolecules, 25, 3345–3350 (1992), disclose the hydrogenation of a high molecular weight, unsaturated polyether using Crabtree's catalyst, a soluble, iridium complex, in methylene chloride under an atmosphere of hydrogen for 1 hour. However, the production of hydroxyl-terminated polyether is neither disclosed nor contemplated.

The polyether compounds provided by the present invention are comprised of n units of residue (1) and m units of residue (2), wherein (i) residues (1) and (2) have the structures:

(1)

and

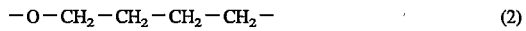
(2)

(ii) the total value of n+m is 2 to 70 and m/(n+m) is 0.05 to 0.98, i.e., residue (2) constitutes from 5 to 98 mole percent of the total moles of residues (1) and (2), and (iii) and at least 98 percent of the terminal groups of the polyether compounds have the structure:

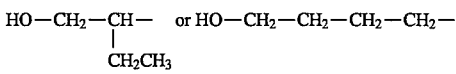

i.e., at least 98 percent of the terminal hydroxyl groups are primary (rather than secondary) hydroxyl groups. The polyether compounds normally have a polydispersity value of less than 4, preferably in the range of 1 to 2.5, and most preferably in the range of 1 to 1.7. Furthermore, the total value of n+m preferably is 7 to 50.

The provision in the above description that at least 98 percent of the terminal groups of the polyether compounds have the structure:

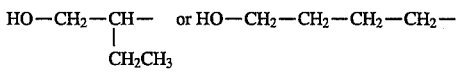

means that the polyethers are essentially free of residues of ethylene oxide and oxetane as terminal groups. See, for example U.S. Pat. Nos. 4,183,821 and 4,299,993 which describe the preparation of intermediate polyethers containing tetrahydrofuran residues and the subsequent reaction of the intermediate polyether with ethylene oxide to obtain an ethoxylated polyether having a high content of primary, terminal hydroxyl groups.

The saturated polyether compounds and polymers may be used in the preparation or formulation of condensation polymers, surfactants, and other compositions analogous to compositions derived from known polyether polymers. It is known that hydroxyl-terminated polyethers wherein all, or substantially all, of the terminal hydroxyl groups are primary are more reactive and thus produce superior products when compared to analogous hydroxyl-terminated polyethers wherein a significant portion of the terminal hydroxyl groups are secondary hydroxyl groups. For example, Wolfe, Rubber Chemistry and Technology, 50(4), 688–703, Sept./Oct. 1977, teaches that titanate-ester-catalyzed melt condensation polymerizations of poly(propylene glycol) having a number-average molecular weight of about 1000 with dimethyl terephthalate and 1,4-butanediol give copolyesterethers having low inherent viscosities and poor properties compared to copolyester/ethers prepared using poly(tetramethylene glycol) and poly(ethylene glycol) having similar molecular weights. The low inherent viscosities and poor properties are due to the relatively high secondary hydroxyl group content of the poly(propylene glycol). Wolfe also discloses that the use of poly(propylene glycol) end-capped with 10–20 weight percent of ethylene oxide does not overcome the problem, as only a marginal improvement in inherent viscosity was realized. Due to the higher reactivity of the formed primary hydroxyl, end-capping polyethers having secondary terminal hydroxyl groups with ethylene oxide to increase primary hydroxyl content typically is only partially successful. In order to achieve a majority of primary hydroxyl end groups, e.g., greater than 65 percent, large amounts of ethylene oxide are needed and usually give concomittant formation of long ethylene blocks and causes the resulting polyether to have reduced hydrophobicity and thus limits the usefulness of the polyethers in the manufacture of condensation polymers. The high content of primary, terminal hydroxyl groups possessed by the polyether polymers of the present invention renders the polyethers more reactive, and thus more useful, for condensation reactions in general.

Poly(tetramethylene ether) glycol is the industry standard for the preparation of high performance condensation polymers such as Hytrel polymer and polyurethane ethers such as Lycra spandex polymer. Efforts to incorporate a substituted oxirane such as propylene oxide and butylene oxide for purposes of price and performance give increased concentrations of secondary hydroxyl groups. The polyethers of this invention overcome this difficulty without the incorporation of ethylene oxide or oxetane. The polyethers of this invention are fundamentally different from ethoxylated copolyethers of tetrahydrofuran and butylene oxide, which are expected to have increased hydrophobicity and decreased thermal stability compared to poly(tetramethylene ether) glycol.

The polyether polymers of this invention may be ethoxylated by methods known in the art to form copolymers containing one or more ethylene oxide blocks and such block copolyethers are expected to have surfactant properties. The primary, terminal hydroxyl groups of the novel polyethers of this invention offer the potential advantage of adding very short ethylene oxide blocks to the polyethers to produce polyether derivatives having unique properties. Generally, the addition of short ethylene oxide blocks to polyethers having a significant content of secondary, terminal hydroxyl groups is not possible.

The polyether polymers of the present invention may be prepared by first polymerizing 3,4-epoxy-1-butene in the presence of a hydroxyl initiator compound and a catalyst to obtain the corresponding unsaturated polymer comprising n' units of residue (1A) and m' units of residue (2A), wherein the total value of n'+m' is 2 to 70 and m'/(n'+m') is 0.05 to 0.98 and residues (1A) and (2A) have the structures:

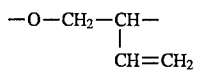  (1A)

and

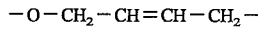  (2A)

The unsaturated polymer then may be catalytically hydrogenated to obtain the novel polyether polymers of the invention.

The unsaturated precursor polymers wherein m'/(n'+m') is in the range of 0.05 to 0.30 are prepared by polymerizing 3,4-epoxy-1-butene in the presence of a catalytic amount of certain acidic compounds and a hydroxyl initiator compound. The acidic catalysts may be selected from strong acids such as sulfuric acid; perchloric acid; fluoroboric acid; strongly acidic ion exchange resins, e.g., Amberlyst resins; and fluorosulfonic acids such as perfluoro-alkanesulfonic acids containing up to about 6 carbon atoms, e.g., trifluoromethanesulfonic acid and fluorosulfonic acid and perfluorosulfonic acid polymers, e.g., Nafion resins, e.g., Nafion NR-50 acidic resin. Although strong acids generally are capable of effecting reaction of 3,4-epoxy-1-butene and an initiator, most exhibit limited activity and result in the formation of low molecular weight products. The most effective catalysts are the perfluoroalkanesulfonic acids such as trifluoromethanesulfonic acid and, especially, Nafion NR-50 acidic resin which has been cryogenically ground to 60 to 100 mesh (particles having an average diameter of 170 to 250 microns), available from C. G. Processing of Rockland, Del. The amount of the acidic catalyst which may be used can vary substantially depending, for example, on process conditions and the particular strong acid employed. In batch operation of the process, the amount of catalyst used typically is in the range of 0.5 to 1.5 mole percent based on the equivalents of initiator.

The acid-catalyzed polymerization normally is conducted in the presence of a solvent, e.g., an inert, organic solvent such as a hydrocarbon, chlorinated hydrocarbon, acyclic ether, and the like. Specific examples of such solvents include benzene, toluene, xylene, heptane, methylene chloride, chloroform, diethyl ether, and the like. The polymerization may be carried out at temperatures in the range of about 0° to 150° C., depending upon the choice of initiator, solvent, and catalyst. Temperatures of about 20° to 60° C. are preferred. Reaction pressure is not an important part of our novel process, and, therefore, the process typically is performed at approximately atmospheric pressure although pressure moderately above or below atmospheric may be used.

The unsaturated precursor polymers wherein m'/(n'+m') is in the range of 0.30 to 0.75 are prepared by polymerizing 3,4-epoxy-1-butene in the presence of a catalytic amount of a palladium(0) complex and a hydroxyl initiator compound. The palladium catalyst comprises palladium(0) in complex association with about 2 to 4 ligands, such as the catalysts disclosed in Published International PCT Application WO 89/02883. The palladium-ligand catalyst may be preformed or formed in situ, and those skilled in the art recognize that the palladium-ligand catalyst can be generated in a variety of ways. Suitable ligands include trihydrocarbyl phosphines and trihydrocarbylarsines, e.g., triphenylphosphine, tributylphosphine, trimethylphosphine, 1,2-bis(diphenylphosphino)ethane, triphenylarsine, tributylarsine, the trisodium salt of tri(m-sulfophenyl)phosphine, and the like. Those skilled in the art recognize that palladium(0) complexes also can be stabilized by other ligands such as, for example, olefins, phosphites, and the like. Tris(dibenzylideneacetone)dipalladium(0) is an example of a specific palladium(0) catalyst containing another type of ligand. The catalyst also may be formed in situ by adding palladium(0) and a ligand separately, e.g., 5% palladium on carbon and triphenylphosphine or tris(dibenzylideneacetone)dipalladium(0) and 1,2-bis(diphenylphosphino)ethane.

The palladium(0) complex may be supported on a polymer substrate. In this form, one substituent of at least one of the ligands is a repeating unit of a polymer. An example of a commercially available palladium complex supported on a polymer substrate is polymer-supported tetrakis(triphenylphosphine)palladium(0) available from Aldrich Chemical Co., Inc. The amount of the palladium(0) catalyst which may be used can vary substantially depending, for example, on process conditions and the particular palladium compound employed. In batch operation of the process, the amount of catalyst used typically is in the range of 0.4 to 1.0 mole percent based on the moles of palladium(0) metal and equivalents of initiator.

The palladium-catalyzed polymerization normally is conducted in the absence of solvent. However, inert solvents such as hydrocarbons, chlorinated hydrocarbons, and the like may be used if desired. Examples of such solvents include benzene, toluene, xylene, heptane, methylene chloride, chloroform, and the like. The palladium-catalyzed polymerization may be carried out at temperatures in the range of about −40° to 60° C., depending upon the choice of initiator, solvent, and catalyst. The polymerization temperature affects the ratio of repeating units (1A) and (2A) set forth above, with lower polymerization temperatures generally favoring the formation of residues (2A):

$$-O-CH_2-CH=CH-CH_2 \qquad (2A)$$

Temperatures of about −10° to 50° C. are preferred. Reaction pressure is not an important part of our novel process and, therefore, the process typically is performed at approximately atmospheric pressure although pressure moderately above or below atmospheric may be used.

The unsaturated precursor polymers wherein m'/(n'+m') is in the range of 0.75 to 0.98 may be obtained by polymerizing 3,4-epoxy-1-butene in the presence of a catalyst system comprising an onium iodide compound such as an ammonium or phosphonium iodide and an organotin compound such as a trihydrocarbyltin iodide. The onium iodide component of the catalyst system may be selected from a variety of tetra(hydrocarbyl)ammonium iodides and tetra(hydrocarbyl)phosphonium iodides, preferably having a total carbon atom content of about 16 to 72 carbon atoms. Such compounds have the formulas:

wherein each $R^1$ substituent independently is selected from alkyl of up to about 20 carbon atoms and each $R^2$ substituent is independently selected from $R^1$, benzyl phenyl or phenyl substituted with up to 3 substituents selected from lower alkyl, e.g., alkyl of up to about 4 carbon atoms, lower alkoxy or halogen; or two $R^1$ substituents collectively may represent alkylene of 4 to 6 carbon atoms including alkylene of 4 to 6 carbon atoms substituted with lower alkyl; provided, as specified above, that the quaternary iodide compounds contain about 16 to 72 carbon atoms. Specific examples of the onium iodide catalyst component include tetra-n-octylphosphonium iodide, tri-n-octyl(n-dodecyl)-phosphonium iodide, tri-n-octyl(n-hexadecyl)phosphonium iodide, tri-n-octyl(n-octadecyl)phosphonium iodide, tetra-n-dodecylphosphonium iodide, tetra-n-hexadecylphosphonium iodide, tetra-n-octadecylphosphonium iodide, tetra-n-dodecylammonium iodide, tetra-n-hexadecyl-ammonium iodide, and tetra-n-octadecylammonium iodide. The preferred onium iodides are tetra-n-alkyl-phosphonium iodides containing about 32 to 72 carbon atoms, especially compounds of formula (II) above wherein each $R^2$ is straight-chain alkyl of about 4 to 18 carbon atoms. Tetra-n-dodecylphosphonium iodide, tetra-n-hexadecylphosphonium iodide, and tri-n-octyl(n-octadecyl)phosphonium iodide are especially preferred.

The organotin catalyst component may be selected from organotin (IV) iodides such as hydrocarbyltin triiodides, di(hydrocarbyl)tin diiodides, and tri(hydrocarbyl)tin iodides. Examples of such organotin (IV) iodide compounds have the general formula

$$(R^3)_n-Sn-I_{(4-n)} \qquad (III)$$

wherein each $R^3$ independently is selected from alkyl or substituted alkyl moieties having up to about 20 carbon atoms, cycloalkyl or substituted cycloalkyl having about 5 to 20 carbon atoms, carbocyclic aryl or substituted carbocyclic aryl having about 6 to 20 carbon atoms, or heteroaryl or substituted heteroaryl moieties having about 4 up to 20 carbon atoms; and n is 1, 2, or 3. Specific examples of the organotin compounds include di-n-butyltin diiodide, tri-n-butyltin iodide, tri-n-octyltin iodide, triphenyltin iodide, trimethyltin iodide, n-butyltin triiodide, tricyclohexyltin iodide, tris(2-methyl-2-phenylpropyl)tin iodide, tribenzyltin iodide, dimethyltin diiodide and diphenyltin diiodide. Other organotin halides such as chlorides and bromides may be used in the process wherein they are converted to the iodide compounds. The preferred organotin iodide compounds have the general formula:

$$(R^3)_3-Sn-I \qquad (IV)$$

wherein each $R^3$ independently is selected from alkyl having about 4 to 10 carbon atoms, phenyl, or 2-methyl-2-phenylpropyl.

The ratio of the onium iodide and organotin iodide components of the catalyst system can vary substantially depending, for example, upon the particular compounds used. Generally, the quaternary onium iodide:organotin iodide mole ratio is within the range of about 20:1 to 0.05:1. For the preferred catalyst system comprising a phosphonium iodide and an organotin iodide, a phosphonium iodide:organotin iodide mole ratio of about 5:1 to 0.2:1 is especially preferred.

In the synthesis of the unsaturated polyether precursor compounds by each of the 3 processes described herein, the primary reactant, 3,4-epoxy-1-butene is added to a mixture of the catalyst or catalysts, a hydroxyl initiator compound, and, optionally, a solvent. The 3,4-epoxy-1-butene monomer may be added all at once or, preferably, slowly or in stepwise increments to a mixture of the catalyst and the initiator. Slow addition of 3,4-epoxy-1-butene is preferred for controlling the conversion, controlling the product molecular weight, and minimizing side reaction. Stepwise addition of the 3,4-epoxy-1-butene monomer gives stepwise increase in polymer molecular weight. Thus, molecular weight control is achieved by the stoichiometry of monomer to initiator. A wide variety of molecular weights may be achieved, but the molecular weights are generally controlled to provide polymers with molecular weights of about 500 to 3000 for use as condensation polymer intermediates. The process may be carried out in a batch, semi-continuous, or continuous mode of operation.

The hydroxyl initiator compound useful in the preparation of the unsaturated polyether precursors by each of the 3 processes described herein may be selected from a vast number and broad variety of mono- and poly-hydroxy compounds. Normally, the residue of the hydroxyl initiator compound constitutes at least 0.5 weight percent of the polyether. The mono-hydroxy initiators include low molecular weight organic alcohols and polymeric alcohols which may be linear or branched chain, aliphatic, alicyclic, or aromatic. The mono-hydroxy initiators preferably are selected from alkanols containing up to about 20 carbon atoms. When an alcohol is used as the initiator, the polyether polymeric product obtained has a primary hydroxyl group on one end of the polymer chain and thus is a polymeric alcohol. The other end of the polymer chain is terminated with the residue of the alcohol initiator, e.g., a residue having the formula —O—$R^4$ wherein $R^4$ is the residue of an alcohol, preferably an alkyl group, containing up to about 20 carbon atoms. Although secondary or tertiary alcohols may be used, primary alcohols are preferred. The secondary alcohols are converted to primary hydroxyls and, thus, this invention provides a novel method of converting secondary hydroxyls to primary hydroxyls without the use of ethylene oxide. Some typically useful alcohol initiators include methanol, ethanol, n-butanol, iso-butanol, 2-ethylhexanol, n-decanol, stearyl alcohol, cetyl alcohol, allyl alcohol, benzyl alcohol, phenol, and the like. Water also may be used as the initiator. Also, an inorganic hydroxide such as litium hydroxide may be used as the initiator in the polymerization of 3,4-epoxy-1-butene in the presence of a palladium(0) complex.

The poly-hydroxyl initiators contain 2 or more hydroxyl groups and may be monomeric or polymeric compounds. Examples of the poly-hydroxyl initiators include ethylene glycol, 1,2-propanediol, 1,3-propanediol, 1,2-butanediol, 1,4-butanediol, 1,6-hexanediol, 1,4-cyclohexanediol, 1,4-cyclohexanedimethanol, 2,2-di-methyl-1,3-propanediol, 2,2,4-trimethyl-1,3-pentanediol, 2,2,4,4-tetramethyl-1,3-cyclobutanediol, 2--butene-1,4-diol, 1-butene-3,4-diol, hydroquinone, resorcinol, bis-phenol-A, glycerol, trimethylolpropane, starch, sucrose, glucose, pentaerythritol, polyethylene glycol, polypropylene glycol, polybutylene glycol, poly(tetramethylene ether) glycol, and hydroxyl-terminated, low molecular weight polyesters. When a poly-hydroxyl compound is used as the initiator, the polyether polymer typically grows from at least 2 of the hydroxyl groups of the initiator and the subsequently-obtained polymer is a polyhydroxyl polymer. The residue of the poly-hydroxyl initiators may be represented by the formula —O—$R^5$—O— wherein $R^5$ is the residue of a poly-hydroxyl initiator. The diols having 2 to 6 carbon atoms constitute the preferred initiators.

The residues of the hydroxyl initiator compounds may constitute a minor or major portion of the molecular weight of the unsaturated polyether precursor polymers as well as the saturated polyether polymers of the invention. For example, if a polymeric initiator, such as a hydroxyl-terminated polyoxyalkylene polymer, is employed and the number of repeat units of 3,4-epoxy-1-butene residue is relatively low, the initiator residue content of the polymer may be greater than 90 weight percent. On the other hand, if the initiator employed is a low molecular weight compound such as methanol or water, the initiator residue may constitute as low as 0.5 weight percent of the polymer. Both the unsaturated and saturated polyether polymers typically comprise at least 80 weight percent, preferably at least 90 weight percent, 3,4-epoxy-1-butene residues. Both the unsaturated and saturated polyether polymers preferably comprise 5 to 20 weight percent, most preferably 5 to 10 weight percent, of residues derived from the hydroxyl initiator compounds, e.g., residues —O—$R^4$ and —O—$R^5$—O—.

The saturated polyether polymers of the present invention comprising residues (1) and (2) are prepared by contacting the unsaturated polyether precursors described hereinabove with hydrogen in the presence of a hydrogenation catalyst at elevated temperature and pressure. The hydrogenation catalyst may be selected from a wide variety of known materials such as catalysts containing one or more metals selected from palladium, rhodium, platinum, ruthenium, iridium, nickel, cobalt, copper, and the like. The catalyst may consist of one or more of the metals deposited on the surface of a suitable catalyst support material such as carbon, alumina, silica, silica-alumina, titania, kieselguhr, molecular sieves, zeolites, and the like.

The use of nickel catalysts in the hydrogenation of the unsaturated polyether precursors to the polyether polymers of the present invention is particularly advantageous. It has been found that nickel hydrogenation catalysts are effective to give complete, or essentially complete, hydrogenation of the olefinic unsaturation of the polyether precursors without concomitant hydrogenolysis of the polyether linkages and subsequent decrease in molecular weight, i.e., without causing degradation of the polymer. Thus, another embodiment of the present invention is a process for the preparation of a saturated polyether polymer which comprises contacting an unsaturated polyether precursor with hydrogen in the presence of a nickel hydrogenation catalyst under hydrogenation conditions of pressure and temperature, wherein (i) the saturated polyether polymer is comprised of n units of residue (1) and m units of residue (2) wherein residues (1) and (2) have the structures:

(1)

and

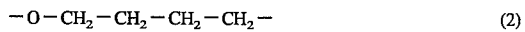
(2)

(ii) the total value of n+m is 2 to 70 and m/(n+m) is in the range of about 0.05 and 0.98; (iii) the saturated polyether polymer comprises at least 1 weight percent of the residue of a hydroxyl initiator compound; and (iv) the unsaturated polyether precursor is comprised of residues (1A) and (2A):

(1A)

and

(2A)

The nickel hydrogenation catalyst may be Raney-nickel or a supported nickel catalyst, e.g., a catalyst comprising about 10 to 80, preferably 25 to 65, weight percent nickel, based on the total weight of the catalyst, deposited on the surface of a suitable catalyst support material. Typical catalyst support materials include carbon, alumina, silica, silica-alumina, titania, kieselguhr, molecular sieves, zeolites, and the like. Nickel catalysts modified or promoted with, for example, molybdenum, chromium, iron, zirconium, and/or cobalt also may be used.

The hydrogenation conditions of temperature and pressure can vary substantially depending on several factors such as contact time with the catalyst, the amount of catalyst, the choice of catalyst, and the mode of operation. Hydrogenation temperatures of about 20° to 200° C. may be used although temperatures in the range of about 50° to 80° C. are preferred. The hydrogenation process may be carried out using total pressures in the range of about 2.4 to 414.5 bars absolute (20 to 6000 psig), preferably 35.5 to 70 bars (500 to 1000 psig). As noted above, the optimum combination of temperature and pressure depends on other process variables but can be readily ascertained by those skilled in the art.

The hydrogenation process optionally may be carried out in the presence of inert solvents such as aliphatic and aromatic hydrocarbons, ketones, ethers, alcohols, water, and the like. For example, benzene, toluene, tetrahydrofuran, methanol, ethanol, butanol, methyl isoamyl ketone, and the like may be used individually or in combination as solvent.

For the unsaturated polyether precursors prepared by the palladium-catalyzed polymerization of 3,4-epoxy-1-butene, the palladium(0) polymerization catalyst may be removed by pretreatment with hydrogen pressure alone to precipitate the palladium with minimal concomitant hydrogenation of the unsaturated polyether, followed by filtration of the precipitated palladium metal. Also, if a water soluble phosphine ligand, such as a sulfonated triphenylphosphine, is used, such phosphine ligand and complexed palladium(0) may be removed from the polymer by aqueous washings. After the removal of the catalyst components as described, the unsaturated polyether precursor may be hydrogenated in the presence of a nickel hydrogenation catalyst.

Alternatively, the unsaturated polyether precursors prepared by the palladium-catalyzed polymerization of 3,4-epoxy-1-butene may be hydrogenated directly, i.e., without the above-described removal of catalyst components, by contacting the precursor polymer with hydrogen in the presence of a supported palladium catalyst. The supported palladium catalyst may consist of about 0.5 to 15, preferably about 5, weight percent palladium deposited on a catalyst support material such as carbon, alumina, silica, silica-alumina, titania, kieselguhr, molecular sieves, zeolites, and the like. The palladium catalysts also may contain molybdenum, chromium, zinc, zirconium and or cobalt as catalyst modifiers or promoters. An especially preferred catalyst is 5% palladium on carbon.

The hydrogenation process may be carried out in a batch, semi-continuous, or continuous mode of operation. For example, batch operation may comprise agitating a slurry of catalyst and unsaturated polyether precursor comprised of residues (1A) and (2A), and, optionally, a solvent in a pressure vessel for a time sufficient to hydrogenate essentially all of the olefinic unsaturation. The catalyst can be separated from the hydrogenated mixture by filtration and the saturated polyether compound isolated by evaporation of solvent.

Another mode of operation uses a fixed bed of a catalyst wherein the unsaturated polyether compound is hydrogenated by feeding a solution of the compound in an inert solvent to the top of a columnar, pressure reactor containing one or more fixed beds of a supported nickel catalyst. The reactant solution flows (trickles) over the catalyst bed in the presence of hydrogen at elevated temperature and pressure, and the hydrogenated product exits the bottom of the reactor and is isolated by evaporation of solvent.

Our novel polyether polymers preferably are comprised of n units of residue (1) and m units of residue (2), wherein the total value of n+m is about 7 to 50 and m/(n+m) is a value in the range of 0.15 to 0.30. The polymers are further characterized in that at least 99 percent of the terminal hydroxyl groups are primary (rather than secondary) hydroxyl groups. The primary hydroxyl groups (and thus the polymers) are more reactive for condensation polymerization reactions in general. The polyether polymers normally have a polydispersity value of less than 4, preferably in the range of 1 to 2.5, and most preferably in the range of 1 to 1.7. The polyether polymers wherein the total value of n+m is about 10 to 30 are particularly preferred.

The preparation of the unsaturated polyether precursors and the novel saturated polyether polymers of the present invention and the operation of the hydrogenation process are further illustrated by the following examples. Proton NMR spectra are obtained on a 300 MHz NMR spectrometer with samples dissolved in deuterated chloroform containing tetramethylsilane as an internal standard. The value of m/(n+m) is determined by comparison of the integrated proton NMR absorptions of residues (1) and (2). The value of m'/(n'+m') is determined by comparison of the integrated proton NMR absorptions of residues (1A) and (2A). The percent hydrogenation is determined by comparison of the integrated proton NMR absorptions of residues (1) and (2) with the integrated proton NMR absorptions of remaining residues (1A) and (2A). Number average molecular weights ($M_n$) and polydispersity values ($M_w/M_n$) are determined using size-exclusion chromatography with refractive index detection in tetrahydrofuran using four 10 μm PLgel mixed-bed columns and calibrated using narrow molecular weight distribution polystyrene standards. Hydroxyl numbers are determined from titration of the acetic acid formed by the reaction of the sample with acetic anhydride. J-resolved NMR and $^{13}C$ NMR analyses, obtained from a 400 MHz NMR spectrometer, are used to determine the percent of primary hydroxyl end groups. Further conformation may be obtained by trifluoroacetylation and $^{19}F$ NMR analyses.

REFERENCE EXAMPLE 1

Methylene chloride (400 mL), 18.0 g (0.200 mole) of 1,4 butanediol, and 0.2 mL of trifluoromethane sulfonic acid are charged to a 3-neck, 1-L, round-bottom flask having a nitrogen atmosphere and equipped with a thermocouple, mechanical stirrer, septum, and reflux condenser with argon inlet. With stirring, 3,4-epoxy-1-butene (392.5 g, 5.60 mole) is added at a rate of 60 g/hr by liquid pump. The temperature rises initially to about 42° C., gently refluxing the solvent, and continued to rise, reaching 58° C. near complete addition of the 3,4-epoxy-1-butene. After complete addition the reaction is allowed to cool and stirred for 1 hour. To the reaction mixture is added 100 mL of 5 percent sodium carbonate solution, and the mixture is stirred for 30 minutes. Then the layers are allowed to separate, and the bottom organic layer is removed, dried over anhydrous magnesium sulfate, filtered, and evaporated to give a clear, light-yellow oil that is an unsaturated polyether glycol comprising n' repeat units of residue (1A) and m' repeat units of residue (2A), wherein n'+m' is about 15; m'/(n'+m') is 0.16; $M_n$=1400 and $M_n$=1.99; and hydroxyl number=103.4.

REFERENCE EXAMPLE 2

Methylene chloride (80 mL), 1,4-butanediol (3.62 g, 40.0 mmole), and 3 drops of trifluoromethane sulfonic acid are charged to a 3-neck, 300-mL, round-bottom flask having an argon atmosphere and equipped with a thermo-couple, mechanical stirrer, and a septum with argon inlet. Stirring is begun and the reaction flask is cooled with a cooling bath composed of water and ice and having a temperature of 0° to 5° C. 3,4-Epoxy-1-butene (40 mL, 500 mmole) is added dropwise at a rate of 9 mL/hour by syringe pump. After the addition of the 3,4-epoxy-1-butene is complete, the cooling bath is removed and the reaction is allowed to warm to room temperature. Solid calcium oxide is added and the mixture stirred for several hours to neutralize the acid. The mixture is then filtered and the liltrate evaporated to give 35 g of a clear, colorless oil having a n'+m' value of approximately 17 and a m'/(n'+m') value of 0.15; Mn=1270 and Mw/Mn=1.94; and hydroxyl number=100.5.

REFERENCE EXAMPLE 3

The procedure described in Reference Example 2 is repeated in the absence of a solvent and at a reaction temperature between 20° and 30° C. by cooling with cool water and adding small amounts of ice as needed. The resulting clear, colorless oil has a n'+m' value of approximately 18 and a m'/(n'+m') value of 0.14; Mn=1305 and Mw/Mn=2.00; and hydroxyl number=97.18. NMR analysis of this product shows no evidence of secondary hydroxyl end groups.

REFERENCE EXAMPLE 4

1,4-Butanediol (21.6 g, 0.240 mole) and 10 drops of trifluoromethane sulfonic acid dissolved in 250 mL of methylene chloride are charged to a 3-neck, 1-L, round-bottom flask having an argon atmosphere and equipped with a thermocouple, mechanical stirrer, septum, and reflux condenser with argon inlet. With stirring, 3,4-epoxy-1-butene (471 g, 6.72 mole) is added dropwise at a rate of 60 g/hour by liquid pump. The temperature rises initially to about 42° C., gently refluxing the solvent, and continued to rise, reaching 58° C. near the completion of the addition of the 3,4-epoxy-1-butene. After complete addition the reaction is allowed to cool and stir for 1 hour. The reaction mixture is washed twice with water, dried over anhydrous magnesium sulfate, filtered, and evaporated to give 468 g of a light yellow oil having a n'+m' value of approximately 29 and a m'/(n'+m') value of about 0.17; Mn=2100 and Mw/Mn=2.64; and hydroxyl number=46.09.

REFERENCE EXAMPLE 5

1,4-Butanediol (0.90 g, 0.010 mole) and 1 drop of trifluoromethane sulfonic acid dissolved in 10 ml of toluene are charged to a reaction flask having a nitrogen atmosphere and equipped with a refluxing condenser. With stirring, the reaction solution is heated to 100° C. by an oil bath. 3,4-Epoxy-1-butene (9.1 g, 0.13 mole) is added dropwise at a rate of 0.15 mL/minute by syringe pump. After complete addition the reaction is allowed to cool and stir for 15 minutes. The reaction mixture is washed twice with water, dried over anhydrous magnesium sulfate, filtered, and evaporated to give 8.0 g of a black oil having a n'+m' value of approximately 14 and a m'/(n'+m') value of about 0.26; Mn=950 and Mw/Mn=2.16; and hydroxyl number=95.0.

REFERENCE EXAMPLE 6

3,4-Dihydroxy-1-butene (0.88 g, 0.010 mole) and 1 drop of trifluoromethane sulfonic acid dissolved in 10 mL of methylene chloride are charged to a reaction flask having a nitrogen atmosphere and an 18° C. chilled water cooling bath. With stirring, 3,4-epoxy-1-butene (9.1 g, 0.13 mole) is added dropwise at a rate of 0.15 mL/minute by syringe pump. After complete addition, the reaction is allowed to cool and stir for 15 minutes. The reaction mixture is washed with 5% sodium carbonate in water, dried over anhydrous sodium carbonate, filtered, and evaporated to give 8.6 g of a clear, colorless oil having a n'+m' value of approximately 14 and a m'/(n'+m') value of about 0.13; Mn=1400; and Mw/Mn=1.68.

REFERENCE EXAMPLE 7

The procedure described in Reference Example 6 is repeated using 0.18 g (0.010 mole) of water as the initiator in place of 1,4-butanediol, yielding 8.6 g of a clear, colorless oil having a n'+m' value of approximately 15 and a m'/(n'+m') value of about 0.14; Mn=1400; and Mw/Mn=1.68.

REFERENCE EXAMPLE 8

To a 3-neck, 300-mL, round-bottom flask having an argon atmosphere and equipped with a thermocouple, mechanical stirrer, and a septum with argon inlet is charged tetrakis(triphenylphosphine)palladium(0) (0.25 g, 0.22 mmole) and 1,4-butanediol (7.22 g, 80.0 mmole). Stirring is begun and a total of 83.2 mL (1040 mmole) of 3,4-epoxy-1-butene is added dropwise at a rate of 9 mL/hr by syringe pump. After about 1 mL of 3,4-epoxy-1-butene is added, the reaction flask is cooled with a cooling bath composed of water and ice and having a temperature of 0° to 5° C. The reaction temperature is maintained between 10° and 15° C. by cooling for the duration of the 3,4-epoxy-1-butene addition. After complete addition, the cooling bath is removed, and the reaction is allowed to warm to room temperature. The resulting clear, yellow oil is an unsaturated polyether glycol having a n'+m' value of about 15; a m'/(n'+m') value of about 0.65; $M_n$=1300 and $Mw/M_n$=1.39; and hydroxyl number=101.8.

REFERENCE EXAMPLE 9

Tetrakis(triphenylphosphine)palladium(0) (0.25 g, 0.22 mmole) and 1,4-butanediol (3.62 g, 40.0 mmole) are charged to a 3-neck, 100-mL, round-bottom flask having an argon atmosphere and equipped with a thermocouple, mechanical stirrer, and a septum with argon inlet. Stirring is begun and a total of 41.8 mL (520 mmole) of 3,4-epoxy-1-butene is added dropwise at a rate of 9 mL/hour by syringe pump. After about 1 mL of 3,4-epoxy-1-butene is added, the reaction flask is cooled with a cooling bath composed of water and ice and having a temperature of 0° to 5° C. The reaction temperature is maintained between 10° and 15° C. by cooling for the duration of the 3,4-epoxy-1-butene addition. After addition is complete, the cooling bath is removed, and the reaction mixture is allowed to warm to room temperature. The resulting clear, yellow oil has a n'+m' value of approximately 17, a m'/(n'+m') value of 0.59, a number average molecular weight (Mn) of 1300, a weight average molecular weight (Mw) of 1800, a polydispersity value (Mw/Mn) of 1.39; and a hydroxyl number of 95.27. NMR analyses of this product showed no evidence of secondary hydroxyl.

REFERENCE EXAMPLE 10

The procedure of Reference Example 9 is repeated using a cooling bath composed of ethylene glycol and Dry Ice and having a temperature of −15° to −25° C. The reaction temperature is maintained between −5° and 5° C. The resulting clear, yellow oil has a n'+m' value of approximately 15 and a m'/(n'+m') value of 0.65; Mn=1110 and Mw/Mn=1.38; and hydroxyl number=130.9.

REFERENCE EXAMPLE 11

The procedure of Reference Example 9 is repeated without using a cooling bath. The reaction temperature increases upon the addition of 3,4-epoxy-1-butene and is maintained between 40° and 50° C. by controlling the rate of addition. The resulting clear, yellow oil has a n'+m' value of approximately 14 and a m'/(n'+m') value of 0.48; Mn=1038 and Mw/Mn=1.44; and hydroxyl number=128.7.

REFERENCE EXAMPLE 12

The procedure in Reference Example 11 is repeated using 1.67 g (40.0 mmole) of lithium hydroxide in place of 1,4-butanediol. The resulting yellow oil is dissolved in 100 mL of methylene chloride and 40 mL of water. Enough dilute hydrochloric acid is added so that the aqueous layer is neutral or slightly acidic to pH paper. The layers are separated, and the methylene chloride is washed with water, dried over magnesium sulfate, filtered, and evaporated to produce 36.6 g of a clear, yellow oil having a n'+m' value of approximately 42 and a m'/(n'+m') value of 0.31; Mn=3245 and Mw/Mn=2.73; and hydroxyl number=23.36.

REFERENCE EXAMPLE 13

The procedure of Reference Example 9 is repeated using 0.27 g (0.20 mmole) of tetrakis(triphenylarsine)palladium(0) in place of tetrakis(triphenylphosphine)-palladium(0). The resulting clear, colorless oil has a n'+m' value of approximately 15 and a m'/(n'+m') value of 0.56; Mn=1185 and Mw/Mn=1.23; and hydroxyl number=129.8.

REFERENCE EXAMPLE 14

The procedure of Reference Example 13 is repeated using a solution of 80 parts by volume 3,4-epoxy-1-butene and 20 parts by volume isopropanol. The resulting clear, yellow oil has a n'+m' value of approximately 12 and a m'/(n'+m') value of 0.60; Mn=950 and Mw/Mn=1.17; and hydroxyl number=162.5.

REFERENCE EXAMPLE 15

The procedure of Reference Example 9 is repeated using 4.33 g (40.0 mmole) of benzyl alcohol in place of 1,4-butanediol. The resulting clear, yellow oil has a m'/(n'+m') value of 0.46 and hydroxyl number=48.59.

REFERENCE EXAMPLE 16

The procedure of Reference Example 15 is repeated using 100 mL of heptane as solvent. The clear, yellow oil is isolated by evaporating the volatiles and has a m'/(n'+m') value of 0.32.

REFERENCE EXAMPLE 17

The procedure of Reference Example 9 is repeated using a total of 6.4 mL (80 mmoles) of 3,4-epoxy-1-butene. The resulting clear, colorless oil has a n'+m' value of approximately 2 and a m'/(n'+m') value of 0.63.

REFERENCE EXAMPLE 18

The procedure of Reference Example 9 is repeated using a total of 70 g (1.0 mole) of 3,4-epoxy-1-butene. The resulting clear, yellow oil has a n'+m' value of approximately 26 and a m'/(n'+m') value of 0.48.

REFERENCE EXAMPLE 19

The procedure of Reference Example 13 is repeated using a total of 6.4 mL (80 mmoles) of 3,4-epoxy-1-butene. The resulting clear, colorless oil has a n'+m' value of approximately 2 and a m'/(n'+m') value of 0.73.

REFERENCE EXAMPLE 20

Tris(2-methyl-2--phenylpropyl)tin iodide [also known as trineophyltin iodide] (33.8 g), tri-n-octyl(n-octadecyl)phosphonium iodide (39.0 g), and 1,4-butanediol (10.0 g) are placed in a 4-neck, 250-mL, round-bottom flask equipped with a thermocouple, magnetic stirrer, distillation head, oil heating bath, and reactant feed tube. The mixture is heated to 110° C., and the 3,4-epoxy-1-butene addition is begun. A total of 816 g of 3,4-epoxy-1-butene is added over 44 hours. Then the pressure within the flask is gradually lowered to about 100 torr to completely distill the volatile components from the catalyst/polyether polymer residue. A total of 648.5 g of distillate is collected (79.5% weight recovery). The composition of the distillate is 21.1% 3,4-epoxy-1-butene, 75.3% 2,5-dihydrofuran, and 3.6% crotonaldehyde.

The catalyst/polyether polymer residue and 200 mL of heptane are added to a 500-mL, jacketed, glass vessel equipped with a mechanical stirrer, thermocouple, and bottom stopcock and the mixture is agitated and heated to 65°–75° C. by circulating heated glycol/water from a constant temperature bath to the jacket. Stirring is discontinued, and the mixture is allowed to settle. The layers are separated, and the bottom polyether polymer layer is extracted again with 200 mL of heptane then once more with 100 mL of heptane. The heptane layers containing the extracted catalyst are combined, and the solvent is removed by rotary vacuum evaporation (up to about 70° C. and 30 torr) to give a catalyst-containing material (80.3 g) with the following approximate composition by weight: 31.1% tris(2-methyl-2-phenyl-propyl)tin iodide, 54.9% tri-n-octyl(n-octyldecyl)phosphonium iodide, and 13.9% polyether polymer. The recovered catalyst mixture can be returned to the reaction flask for continued cycles of polymerization and catalyst separation. After removal of residual volatile material by rotary vacuum evaporation (up to about 70° C. and 30 torr) the polyether polymer layer weighs 149.4 g (18.3% yield) and has n'+m' equal to about 11, m'/(n'+m')=approximately 0.94, and $M_w/M_n$=1.59. J-resolved NMR and $^{13}$C NMR analyses of the polyether polymer product in deuterated acetone show no evidence of secondary hydroxyl carbons.

EXAMPLE 1

The unsaturated polyether polymer (10 g) prepared in Reference Example 1, Raney-nickel (1.0 g, prewashed with methanol), and methanol (90 mL) are charged to a 1-L autoclave equipped with a magnetic stirbar. The autoclave is purged with nitrogen, pressurized with 35.5 bar absolute (500 psig) hydrogen and then heated to 80° C., with stirring. The reaction mixture is stirred at 80° C. and at a total pressure of 35.5 bar absolute (500 psig) for 20 hours. After cooling, the pressure is released, and the reaction mixture is removed, filtered, and concentrated by evaporating the methanol to give a clear, colorless oil. The oil is further purified by dissolving in 50 mL methylene chloride, drying over anhydrous magnesium sulfate, filtering, and evaporating the volatiles, giving 9.0 g of a clear, colorless oil comprising n repeat units of residue (1) and m repeat units of residue (2), wherein n+m is about 16 and m/(n+m) is 0.21 [These values are higher than the values of n'+m' and m'/(n'+m') of the starting material because the 1,4-butanediol initiator fragment is identical to repeat unit (2) and is no longer distinguishable in the hydrogenated product.]; $M_n$=1500 and $M_w/M_n$=1.92; hydroxyl number=100.6; and percent hydrogenation>99.

EXAMPLE 2

The unsaturated polyether glycol(250 g) prepared in Reference Example 1, water-wet Raney-nickel (20.0 g), and tetrahydrofuran (450 g) are charged to a 2-L autoclave equipped with a magnetic stirbar. The autoclave is purged with nitrogen, pressurized with 35.5 bar absolute (500 psig) hydrogen then heated to 60° C., with stirring. The reaction mixture is stirred at 60° C. and a total pressure of 35.5 bar absolute (500 psig) for 20 hours. After cooling, the pressure is released, and the reaction mixture is removed, filtered, and concentrated by evaporating the volatiles to give a clear, colorless oil. The oil is further purified by dissolving in 500 mL of methylene chloride, drying over anhydrous magnesium sulfate, filtering, and evaporating the volatiles, giving 200 g of a clear, colorless oil having m/(n+m)=0.21; $M_n$=1300 and $M_w/M_n$=1.73; hydroxyl number=100.3; and percent hydrogenation>99.

EXAMPLE 3

The unsaturated polyether glycol (10 g) prepared in Reference Example 1, 0.8 g of water-wet Raney-nickel, and 100 mL of aqueous tetrahydrofuran (5 volume percent water) are charged to a 250-mL glass high-pressure bottle and placed into a Parr shaker. The bottle is purged with nitrogen, pressurized with 4.5 bar absolute (50 psig) hydrogen and heated to 55° C., with shaking. The reaction mixture is shaken at 55° C. and 4.5 bar absolute (50 psig) for 16 hours. After cooling, the pressure is released, and the reaction mixture is removed, filtered, and concentrated by evaporating the volatiles to give a clear, light-yellow oil. The oil is further purified by dissolving in 50 mL methylene chloride, drying over anhydrous magnesium sulfate, filtering, and evaporating the volatiles, giving 9.1 g of a clear, colorless oil having m/(n+m)=0.21; $M_n$=1200 and $M_w/M_n$=2.33; percent hydrogenation=95.

EXAMPLE 4

The unsaturated polyether glycol (10 g) prepared in Reference Example 1, 1.5 g of 5 percent palladium on charcoal, and 90 mL of aqueous tetrahydrofuran (5 volume percent water) are charged to a 1-L autoclave equipped with a magnetic stirbar. The autoclave is purged with nitrogen, pressurized with 35.5 bar absolute (500 psig) hydrogen then heated to 80° C., with stirring. The reaction mixture is stirred at 80° C. and 35.5 bar absolute (500 psig) total pressure for 20 hours. After cooling, the pressure is released, and the reaction mixture is removed, filtered, and concentrated by evaporating the volatiles to give a clear, colorless oil. The oil is further purified by dissolving in 50 mL methylene chloride, drying over anhydrous magnesium sulfate, filtering, and evaporating the volatiles, giving a clear, colorless oil having m/(n+m)=0.21; $M_n$=900 and $M_w/M_n$=1.94; hydroxyl number=123.5; and percent hydrogenation>99.

EXAMPLE 5

The unsaturated polyether glycol (10 g) prepared in Reference Example 1, 0.50 g of 5 percent rhodium on charcoal, and 100 mL of aqueous tetrahydrofuran (containing 5 volume percent water) are charged to a 250-mL glass high-pressure bottle and placed into a Parr shaker. The bottle is purged with nitrogen, pressurized with 4.5 bar absolute (50 psig) hydrogen and heated to 55° C. with shaking. The reaction mixture is shaken at 55° C. and 4.5 bar absolute (50 psig) total pressure for 25 hours. After cooling the pressure is released, and the reaction mixture is removed, filtered, and concentrated by evaporating the volatiles to give a clear, light-yellow oil. The oil is further purified by dissolving in 50 mL of methylene chloride, drying over anhydrous magnesium sulfate, filtering, and evaporating the volatiles, giving 9.0 g of a clear, colorless oil having m/(n+m)=0.21; $M_n$=830 and $M_w/M_n$=1.62; hydroxyl number=136.6; and percent hydrogenation>99.

EXAMPLE 6

An unsaturated polyether precursor (450 g) prepared according to the general procedure described in Reference Example 1 [m'/(n'+m')=0.17, $M_n$=2420, $M_w/M_n$=1.77, and hydroxyl number=50.66] and 5 percent palladium on charcoal powder (20 g) are charged to a 1-L autoclave equipped with magnetic stirbar and baffles. The autoclave is purged with nitrogen, pressurized with 35.5 bar absolute (500 psig) hydrogen and then heated to 80° C. with stirring. The reaction mixture is stirred at 80° C. and 35.5 bar absolute (500 psig) for 20 hours. After cooling, the pressure is released and the reaction mixture taken up with 600 mL methylene chloride, gravity filtered, and evaporated to give 371 g of a clear, slightly yellow oil having an n+m of value of about 32; m/(n+m)=0.20; $M_n$=2860 and $M_w/M_n$=2.61; hydroxyl number=53.8; and percent hydrogenation>99.

EXAMPLE 7

A 1-L reactor equipped with a glass stirring rod with Teflon paddle and a thermocouple is flushed with argon then charged with 1,4-butanediol (32.5 g, 0.360 moles) and the $H^+$ form of Nafion 1100 EW acidic resin (10.0 g, 9.09 meq, 60–100 mesh). With stirring, 500 g (7.13 mole) of 3,4-epoxy-1-butene is added at a rate of about 130 g/hour by liquid pump. Upon addition of the epoxide, the temperature rises and is maintained below 40° C. by cooling with an ice-water bath. After complete addition the reaction mixture is allowed to cool and stirred for 1 hour. Then the catalyst is removed by filtration, and the filtrate is taken up in 500 mL of methanol.

The methanol solution is then hydrogenated over 20 g of water-wet Raney-nickel at 35.5 bar absolute (500 psig) hydrogen and 60° C. for 24 hours in a 2-L stainless steel stirred autoclave. The Raney-nickel catalyst is removed by filtration, and the filtrate is evaporated with heating and reduced pressure to give a clear, colorless oil. Low molecular weight material, such as cyclic dimers, is removed by passing the oil through a wiped-film evaporator at 120° C. and 0.1 torr to give 292 g of a clear, colorless oil that is a saturated polyether glycol having an n+m value of about 9 and an m/(n+m) value of 0.30; $M_n$=680; $M_w/M_n$=1.16; and hydroxyl number=195.

EXAMPLE 8

A 1-L reactor equipped with a glass stirring rod with Teflon paddle, a stainless steel cooling coil, and a thermocouple is flushed with argon and then charged with distilled water (6.48 g, 0.360 moles) of and the $H^+$ form of Nafion 1100 EW acidic resin (10.0 g, 9.09 meq). The reactor is cooled with ice and with chilled water (5°–10° C.) circulating through the cooling coil. With stirring, 525 g (7.49 mole) of 3,4-epoxy-1-butene is added at a rate of about 130 g/hour by liquid pump. Upon addition of the epoxide, the temperature rises to about to 34° C. and is maintained at about 32° to 36° C. After complete addition the reaction mixture is allowed to cool and stir for 1 hour. Then the catalyst is removed by filtration, and the filtrate is taken up in 500 mL of methanol.

The methanol solution is then hydrogenated over 20 g of water-wet Raney-nickel at 35.5 bar absolute (500 psig) hydrogen and 60° C. for 24 hours in a 2-L stainless steel stirred autoclave. The Raney-nickel catalyst is removed by filtration, and the filtrate is evaporated with heating and reduced pressure to give a clear, colorless oil. Low molecular weight material, such as cyclic dimers, is removed by passing the oil through a wiped-film evaporator at 120° C. and 0.1 torr to give a clear, colorless oil that is a saturated polyether glycol having an n+m value of about 13 and an m/(n+m) value of 0.25; $M_n=1200$ and $M_w/M_n=1.94$; and hydroxyl number=98.7.

EXAMPLE 9

The unsaturated polyether glycol (10 g) prepared in Reference Example 8, 1.5 g of 5 percent palladium on carbon, and 90 mL of tetrahydrofuran are charged to a 1-L autoclave equipped with a magnetic stirbar. The autoclave is purged with nitrogen, pressurized with 21.7 bar absolute (300 psig) hydrogen then heated to 90° C., with stirring. The reaction mixture is stirred at 90° C. and 21.7 bar absolute (300 psig) for 20 hours. After cooling, the pressure is released, and the reaction mixture is removed, filtered, and concentrated by evaporating the volatiles to give a clear, light yellow Oil having m/(n+m) of about 0.64; $M_n=1350$ and $M_w/M_n=1.54$; hydroxyl number=104.7; and percent hydrogenation>99.

EXAMPLE 10

The unsaturated polyether glycol (10 g) prepared in Reference Example 8, 1.5 g of 5 percent rhodium on alumina, and 90 mL of tetrahydrofuran are charged to a 1-L autoclave equipped with a magnetic stirbar. The autoclave is purged with nitrogen, pressurized with 21.7 bar absolute (300 psig), and then heated to 90° C., with stirring. The reaction mixture is stirred at 90° C. and 21.7 bar absolute (300 psig) for 20 hours. After cooling, the pressure is released, and the reaction mixture is removed, filtered, and concentrated by evaporating the volatiles to give a clear, light yellow oil having m/(n+m) of about 0.62; $M_n=1330$ and $M_w/M_n=1.29$; hydroxyl number=125.0; and percent hydrogenation>99.

EXAMPLE 11

The unsaturated polyether glycol (10 g) prepared in Reference Example 8 and 90 mL of tetrahydrofuran are charged to a 1-L autoclave equipped with a magnetic stirbar. No catalyst is added and, thus, the residual palladium used to catalyze the polymerization serves as the hydrogenation catalyst. The autoclave is purged with nitrogen, pressurized with 21.7 bar absolute (300 psig) hydrogen then heated to 90° C., with stirring. The reaction mixture is stirred at 90° C. and 21.7 bar absolute (300 psig) for 20 hr. After cooling, the pressure is released, and the reaction mixture is removed, filtered, and concentrated by evaporating the volatiles to give a clear, light yellow oil having a m/(n+m) value of about 0.68; $M_n=1230$ and $M_w/Mn_n=1.58$; hydroxyl number=130.7; and percent hydrogenation=43.

EXAMPLE 12

The product of Example 11, 1.0 g of water-wet Raney-nickel, and 90 mL of tetrahydrofuran are charged to a 1-L autoclave equipped with a magnetic stirbar. The autoclave is purged with nitrogen, pressurized with 21.7 bar absolute (300 psig) hydrogen then heated to 90° C., with stirring. The reaction mixture is stirred at 90° C. and 21.7 bar absolute (300 psig) for 20 hr. After cooling, the pressure is released and the reaction mixture is removed, filtered, and concentrated by evaporating the volatiles to give a clear, light yellow oil having a m/(n+m) value of about 0.68; $M_n=1250$ and $M_w/M_n=1.60$; hydroxyl number=129; and percent hydrogenation>99.

EXAMPLE 13

The unsaturated polyether glycol (10 g) prepared in Reference Example 20, 2.0 g of water-wet Raney nickel, and 100 mL of tetrahydrofuran (5 volume percent water) are charged to a 250-mL, glass, high-pressure bottle and placed into a Parr shaker. The bottle is purged with nitrogen, pressurized with 4.5 bar absolute (50 psig) hydrogen, and heated to 55° C., with shaking. The reaction mixture is shaken at 55° C. and 4.5 bar absolute total pressure for 48 hours. After cooling, the pressure is released and the reaction mixture is removed, filtered, and concentrated by evaporating the volatiles to give a clear, light-yellow oil. The oil is further purified by dissolving in 50 mL of methylene chloride, drying over anhydrous magnesium sulfate, filtering, and evaporating the volatiles, giving 9.61 g of a clear, colorless oil having an m/(n+m) value of 0.94; and percent hydrogenation=90.

COMPARATIVE EXAMPLE 1

A 50-mL flask equipped with a magnetic stirbar is flushed with argon then cooled with an ice-water bath. To the flask is charged 0.90 g (0.010 mole) of 1,4-butanediol, 8.1 mL (7.2 g, 0.10 mole) of tetra-hydrofuran, 8.6 mL (7.2 g, 0.10 mole) of 1,2-butylene oxide, and 15.8 mL (19.8 g, 0,200 mole) of 1,2-dichloro-ethane. The reaction mixture is stirred for about 15 minutes to cool. Then 0.20 mL (0.070 mmole) of 0.53 g/mL boron trifluoride etherate in ligroin is added, and the reaction mixture is stirred and cooled with the ice-water bath for 4 hours. Then the ice-water bath is removed, and the reaction mixture warms with stirring, reaching a temperature of about 50° C. After stirring overnight, the polymerization solution is neutralized by washing with water three times. The solution is dried over anhydrous magnesium sulfate, filtered, and rotary evaporated to give 10.2 g of a clear, colorless oil. J-resolved NMR and $^{13}C$ NMR analyses show that the oil is a copolyether having a value of m/(n+m) of about 0.20, the hydroxyl groups are on residues (1) only, and about 75% of the hydroxyls are secondary hydroxyls and about 25% are primary hydroxyls.

The copolyether polymers of the present invention differ from the above copolyether polymer prepared as described by Blanchard, et al., in that (i) greater than 95% of the hydroxyls of the copolyether polymers of the present invention are primary hydroxyls while only about 25% of the hydroxyls of the copolyether polymer prepared as described by Blanchard, et al., are primary hydroxyls, (ii) the hydroxyls of the copolyether polymers of the present invention reside on terminal residues of (1) and (2) while the hydroxyls of the copolyether polymer prepared as described by Blanchard, et al., reside only on terminal residues of (1), and (iii) the value of m/(n+m) for the copolyether polymers of the present invention are controlled and varied in the range of 0.05 to 0.95 while the value of m/(n+m) for the copolyether polymers described by Blanchard, et al., are controlled and varied in the range of 0.20 to 0.55.

The invention has been described in detail with particular reference to preferred embodiments thereof, but it will be understood that variations and modifications will be effected within the spirit and scope of the invention.

We claim:

1. Process for the preparation of a saturated polyether polymer which comprises contacting an unsaturated polyether precursor with hydrogen in the presence of a nickel hydrogenation catalyst under hydrogenation conditions of pressure and temperature, wherein (i) the saturated polyether polymer is comprised of n units of residue (1) and m units of residue (2) wherein residues (1) and (2) have the structures:

 (1)

and

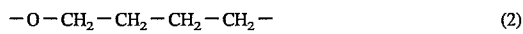 (2)

(ii) the total value of n+m is 2 to 70 and m/(n+m) is in the range of about 0.05 and 0.98; (iii) the saturated polyether polymer comprises at least 0.5 weight percent of the residue of a hydroxyl initiator compound, and (iv) the unsaturated polyether precursor is comprised of residues (1A) and (2A):

 (1A)

and

 (2A)

2. Process according to claim 1 wherein the unsaturated polyether precursor is contacted with hydrogen in the presence of a nickel hydrogenation catalyst at a temperature of 50° to 80° C. and a pressure of 35.5 to 70 bars (500 to 1000 psig).

3. Process for the preparation of a saturated polyether polymer which comprises contacting an unsaturated polyether precursor with hydrogen in the presence of a nickel hydrogenation catalyst selected from the group consisting of Raney nickel and supported nickel catalysts comprising 25 to 65 weight percent nickel at a temperature of 50° to 80° C. and a pressure of 35.5 to 70 bars (500 to 1000 psig), wherein (i) the saturated polyether polymer is comprised of n units of residue (1) and m units of residue (2) wherein residues (1) and (2) have the structures:

 (1)

and

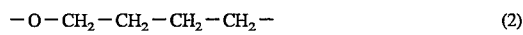 (2)

(ii) the total value of n+m is 7 to 50 and m/(n+m) is in the range of 0.15 and 0.30; (iii) the saturated polyether polymer comprises at least 0.5 weight percent of the residue of a hydroxyl initiator compound, and (iv) the unsaturated polyether precursor is comprised of residues (1A) and (2A):

 (1A)

and

 (2A)

* * * * *